Jan. 19, 1965    L. C. ANSELL    3,165,853
FISH NET
Filed May 17, 1963
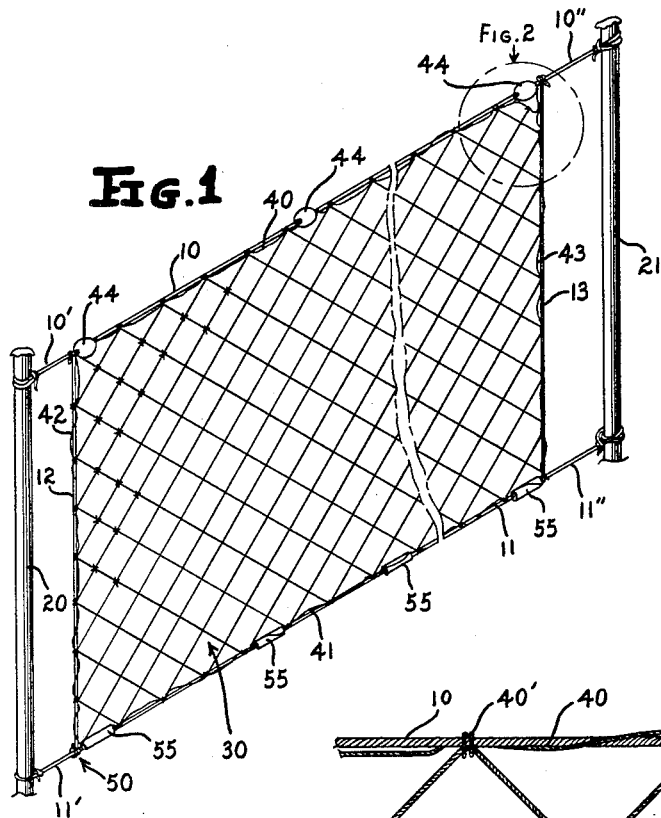
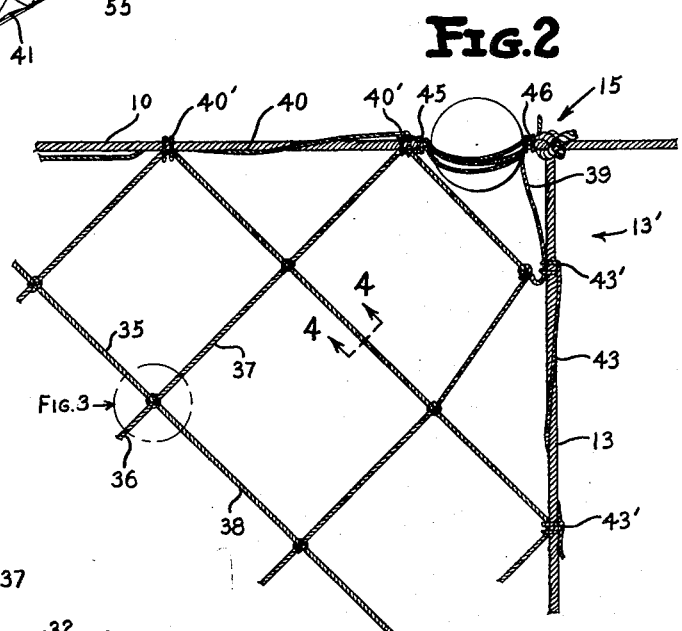
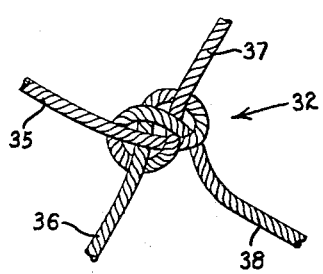
INVENTOR
LACY C. ANSELL
BY Shoemaker and Mattare
ATTORNEYS

United States Patent Office 3,165,853
Patented Jan. 19, 1965

3,165,853
FISH NET
Lacy C. Ansell, 2616 Albermarle Terrace,
Chesapeake, Va.
Filed May 17, 1963, Ser. No. 281,252
3 Claims. (Cl. 43—7)

The present invention relates to a new and novel fish net and more particularly to a fish net which has high resistance to damage from crabs.

The present invention relates to fish nets, boat guards and for other similar types of applications wherein strength, durability and flexibility are required. The fish net of the present invention is of a type commonly referred to as a "gill" net for trapping fish, and a particular problem arises in commercial fishing operations due to the entrapment of crabs on this type of net. Conventional nets for this purpose are generally made of nylon or similar substance which can be readily severed by crabs, and as a consequence, conventional nets made of nylon and the like are extensively damaged by crabs which have become trapped in the nets and which then bite their way out of the nets.

It is a particular object of the invention to avoid the excessive damage now occurring to conventional nets by providing a net of sufficient strength to prevent the mesh portion of the net from being severed by crabs when entrapped therein.

In order for such a net to be practicable in the sizes required for commercial fishing wherein the nets may be hundreds of yards long, it is necessary that the net construction be of a light-weight construction which is substantially no heavier than the nets now in operation. Additionally, these nets of such large extent must be sufficiently flexible so that they can be readily handled, folded and rolled for storage purposes.

Another feature of such nets is the requirement for durability, or in other words they must be of such a construction as to readily absorb the normal usage thereof and furthermore must be long-lived even when immersed in salt water for extensive periods of time. It is accordingly, therefore, necessary to provide an arrangement wherein the mesh portion of the net will last a long time even in salt water.

In order to accomplish the purposes of the present invention, applicant employs a novel construction wherein outer support lines and auxiliary holding lines are provided which may, if desired, be of conventional construction. On the other hand, the central mesh portion of the net is formed of flexible corrosion-resistant wire which is intertwined at the intersections of the mesh portion. The mesh portion of this construction provides a high degree of strength and will successfully resist efforts by crabs and the like to cut the net, and accordingly, the disadvantages encountered with prior art constructions are eliminated in this respect. In addition, the relatively thin wire as employed in the present invention is extremely flexible and light-weight so that the net can be readily handled, folded, rolled or the like in much the same manner as nets of conventional construction. Furthermore, the corrosion-resistant characteristics of the metal employed in the wire of the mesh portion ensures that the net will enjoy a long life even when immersed for extended periods of time in salt water, or other similar elements.

The mesh size may vary in accordance with the intended use for the net, and it is anticipated that nets according to the present invention may be constructed with mesh sizes from approximately ⅛ inch to 5 inches in ⅛ inch increments.

An object of the present invention is to provide a new and novel fish net of high strength mesh construction which is particularly adapted to resist damage normally caused by crabs and the like.

Another object of the invention is the provision of a fish net which is of light-weight construction and substantially no heavier than conventional nylon nets and the like.

A further object of the invention is to provide a fish net which has a high degree of flexibility and which can be readily handled, folded, rolled for storage and the like.

Still another object of the invention is the provision of a fish net having a high degree of durability and which will last a long time even when immersed in salt water for extended periods of time.

A still further object of the invention is to provide a fish net which is quite simple and inexpensive in construction, and yet which is rugged and effective in use.

Other objects and many attendant advantages of the invention will become more apparent when considered in connection with the specification and accompanying drawing, wherein:

FIG. 1 is a top perspective view illustrating the fish net of the present invention mounted in operative position;

FIG. 2 is an enlarged view of the portion indicated in the phantom line in FIG. 1;

FIG. 3 is an enlarged view of the portion indicated in phantom line in FIG. 2; and FIG. 4 is a sectional view taken substantially along line 4—4 of FIG. 2 looking in the direction of the arrows.

Referring now to the drawings wherein like reference characters designate corresponding parts throughout the several views, the fish net includes outer support lines comprising an upper line 10, a lower line 11, and a pair of opposite side lines 12 and 13. Each of these lines may be formed of nylon, rope or similar material, and if desired may in some instances also be formed of wire as is the central mesh portion of the net.

The upper and lower ends of the two sides lines 12 and 13 are tied to the upper and lower lines, one of the knots for tying the upper end of the side line 13 to the upper line 10 being indicated by reference numeral 15 in FIG. 2, the terminal end 13' of the side line 13 being secured in position as hereinafter described.

As seen in FIG. 1, the opposite ends of the upper line 10 are indicated by reference numerals 10' and 10", and the opposite end portions of lower line 11 are indicated by reference numerals 11' and 11", it being noted that these opposite end portions are secured to the upstanding posts 20 and 21 respectively which may be driven into the bottom in the area which it is desired to fish, the net then being suspended in operative position as illustrated, and as will be well understood.

The central main mesh portion of the net is indicated generally by reference numeral 30, and is formed of flexible corrosion-resistant wire such as stainless steel, Inconel, and the like which is adapted to readily resist corrosion even when immersed in salt water. The wire mesh may be formed for example of a single piece of wire which is formed into the mesh configuration illustrated by intertwining the wire at the intersections of the mesh as indicated by the knot means illustrated at 32 in FIG. 3. The portions 35, 36, 37 and 38 of the mesh as shown in enlarged exploded view in FIG. 3 are also illustrated in FIG. 2 so as to illustrate the orientation of the parts and the manner in which the wire is intertwined to form the mesh and the intersections thereof. It will be understood that the portion encircled in FIG. 3 is considered to be an intersection of the mesh portion.

Auxiliary holding means in the form of a nylon or rope member is associated with each of the outer support lines, the auxiliary holding lines being indicated by reference numerals 40, 41, 42 and 43, these holding lines respectively being tied to the outer support lines 10, 11, 12 and 13.

Referring to FIG. 2, the manner in which the holding lines are operatively connected with the associated support lines may be more clearly understood. As seen in this figure, the holding line 40 extends along outer line 10, and at periodic points is tied as indicated by reference numerals 40' to the holding line 10. At each of these points 40', the tie points also engage the mesh portion so as to hold a portion of the mesh portion to the support line 10.

Suitable float means such as corks are indicated by reference numerals 44 and are secured to spaced portions of the upper line 10, the corks being provided with central holes therethrough through which the support line 10 extends. For retaining the corks in predetermined position along the upper support line, the auxiliary holding line may be first knotted as indicated at 45 and again at 46 and passed back and forth between these knots several times so as to hold the cork in its proper operative position, the knot 46 then also encompassing therewithin one terminal end 39 of the wire means from which the mesh portion is formed. It will be understood that the other corks 44 are held in operative position on the upper line 10 in a similar manner to that shown in detail in FIG. 2.

The auxiliary holding line 43 is secured to the side line 13 in a manner similar to that discussed in connection with auxiliary holding line 40, the holding line 43 being knotted at spaced points indicated by reference numerals 43' which serve the dual purpose of holding the auxiliary lines in position and supporting the mesh portion from the outer side line. It will be noted that the uppermost knotted portion 43' as seen in FIG. 2 is employed for securing the terminal end 13' of the side line 13 in fixed relation relative to the side line 13.

It will be understood that the auxiliary holding lines 41 and 42 are connected with the associated outer lines 11 and 12 respectively in a manner identical with that discussed in connection with the holding lines 40 and 43, the spaced knotted portions serving to hold spaced portions of the mesh portion of the net to the outer lines as will be clear. It should also be understood that the opposite terminal end of the wire forming the mesh portion of the net is secured in operative position by the lower end of the auxiliary holding line 42 which is tied as indicated generally by reference numeral 50 to the lower line 11.

Referring to FIG. 4, a cross-section of the wire employed in the mesh portion of the net is illustrated, it being evident that the wire is of the conventional stranded type including a plurality of strands S, and the wire may be of a relatively fine gauge in order to impart the desired degree of flexibility and light weight to the over-all net.

Referring again to FIG. 1, spaced weight means such as conventional lead weights indicated by reference numerals 55 are secured to spaced portions of the lower line 11. These leads weights may be of a generally tubular construction which receives the lower line 11, the lead weights then being suitably secured as by crimping in operative position on the lower line. It is also apparent that if desired, the auxiliary holding line 41 may be employed for assisting in holding the weight means in operative position as the auxiliary holding line 40 is utilized for holding the support or cork means in operative position.

As mentioned previously, the size of the openings in the mesh portion may be varied in accordance with the particular use to be made of the net. It is also apparent that the upper line 10 and the lower line 11 which may be respectively considered the cork line and the lead line may vary in size according to the size and depth of the net.

It is apparent from the foregoing that there is provided a new and novel fish net including a main mesh portion of high strength which is particularly adapted to resist damage by crabs entrapped in the net. Small gauge lightweight wire may be employed for the mesh portion thereby imparting light weight to the over-all net and a high degree of flexibility such that the net can be readily handled. The net displays a high degree of durability and will last a long time even in salt water due to the corrosion-resistant characteristics of the wire employed in the mesh portion. The net according to the present invention is quite simple and inexpensive in construction and yet at the same time is quite rugged and effective in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A fish net comprising outer support lines including an upper line, a lower line and a pair of side lines connected between said upper line and said lower line, the upper and lower end portions of said side lines being tied respectively to said upper line and said lower line, auxiliary holding lines tied to each of said upper line, lower line and side lines, and a mesh portion comprising flexible corrosion resistant wire means defining a mesh having a plurality of intersections, said intersection comprising an intertwining of said wire means, said auxiliary holding lines engaging spaced portions of said mesh portion for connecting said mesh portion with said outer support lines, float means being connected with spaced portions of said upper line by the auxiliary holding line tied thereto, and spaced weight means connected with said lower line.

2. Apparatus as defined in claim 1, wherein the end portions of said wire means are tied to said outer support lines by spaced portions of said auxiliary holding lines.

3. A fish net comprising outer support lines including an upper line, a lower line and a pair of side lines connected between said upper line and said lower line, the upper and lower end portions of said side lines being tied respectively to said upper line and said lower line, said upper and lower lines including portions extending beyond said side lines for connection to suitable support means, auxiliary holding lines having portions thereof tied to each of said upper line, lower line and side lines at spaced intervals along said upper line, lower line and side lines, a mesh portion formed of flexible corrosion resistant wire means defining a mesh having a plurality of inner sections, said inner sections comprising an intertwining of said wire means whereby said wire means is firmly and securely tied at each of said inner sections, said auxiliary holding lines engaging spaced portions of the outer parts of said mesh portion for connecting said outer parts of the mesh portion with spaced portions of said outer support lines, a plurality of float members each of which is disposed in surrounding relationship to said upper line, said float members being held in place on said upper line by one of said auxiliary holding lines which is tied to the upper line and which engages the float members for holding them in position, and a plurality of weight members fixedly attached to spaced portions of said lower line.

References Cited by the Examiner
UNITED STATES PATENTS

| | | | |
|---|---|---|---|
| 194,434 | 8/77 | Howes | 43—14 |
| 343,479 | 6/86 | McClain | 43—14 XR |
| 1,619,366 | 3/27 | Petersen | 43—100 |
| 1,852,491 | 4/32 | Sykes | 43—9 |
| 2,557,240 | 6/51 | Shigaki | 43—7 |
| 2,604,723 | 7/52 | Bennett. | |
| 2,653,372 | 9/53 | Johnson et al. | 43—7 |

ABRAHAM G. STONE, *Primary Examiner.*

F. RAY CHAPPELL, *Examiner.*